United States Patent
Song et al.

(10) Patent No.: US 9,525,533 B2
(45) Date of Patent: Dec. 20, 2016

(54) LTE-BASED METHOD, SYSTEM, AND DEVICE FOR ULTRA-DISTANCE COVERAGE COMMUNICATION

(71) Applicant: ZTE Corporation, Shenzhen, Guangdong (CN)

(72) Inventors: Chunhui Song, Shenzhen (CN); Yang Guo, Shenzhen (CN); Liping Liu, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 248 days.

(21) Appl. No.: 14/401,750

(22) PCT Filed: Aug. 7, 2013

(86) PCT No.: PCT/CN2013/080968
§ 371 (c)(1),
(2) Date: Nov. 17, 2014

(87) PCT Pub. No.: WO2014/029272
PCT Pub. Date: Feb. 27, 2014

(65) Prior Publication Data
US 2015/0117278 A1    Apr. 30, 2015

(30) Foreign Application Priority Data
Aug. 20, 2012  (CN) .......................... 2012 1 0295780

(51) Int. Cl.
*H04J 1/00*    (2006.01)
*H04L 5/00*    (2006.01)
(Continued)

(52) U.S. Cl.
CPC ........... *H04L 5/0053* (2013.01); *H04L 1/0079* (2013.01); *H04L 1/1822* (2013.01); *H04L 1/1854* (2013.01);
(Continued)

(58) Field of Classification Search
None
See application file for complete search history.

(56) References Cited

U.S. PATENT DOCUMENTS

2010/0315956 A1* 12/2010 Nakao .................... H04B 7/155
370/245
2011/0021667 A1    1/2011 Hamai
(Continued)

FOREIGN PATENT DOCUMENTS

CN    101651529 A    2/2010
CN    101790193 A    7/2010
(Continued)

OTHER PUBLICATIONS

Research and realization of uplink data transmission in LTE, Journal of Chongqing University of Posts and Telecommunications(Natural Science Edition),V01. 23 No. 3, mailed on Jun. 2011.
(Continued)

*Primary Examiner* — Jutai Kao
(74) *Attorney, Agent, or Firm* — Oppedahl Patent Law Firm LLC

(57) ABSTRACT

An LTE-based method, system, and device for ultra-distance coverage communication. The method comprises: increasing an uplink feedback subframe interval at a terminal side and an uplink feedback subframe interval at a base station side; after receiving uplink scheduling information sent by the base station side, the terminal side sending data over a subframe whose subframe interface is the increased uplink feedback subframe interval at the terminal side; and the terminal side receiving data verification information that is delivered by the base station side over a subframe whose subframe interval is the increased uplink feedback subframe interval at the base station side.

17 Claims, 5 Drawing Sheets

(51) Int. Cl.
*H04W 72/12* (2009.01)
*H04L 1/00* (2006.01)
*H04L 1/18* (2006.01)
*H04L 5/14* (2006.01)
*H04W 72/04* (2009.01)

(52) U.S. Cl.
CPC ........... *H04L 1/1887* (2013.01); *H04L 1/1896* (2013.01); *H04L 5/14* (2013.01); *H04W 72/0413* (2013.01); *H04W 72/1268* (2013.01)

(56) References Cited

U.S. PATENT DOCUMENTS

| | | |
|---|---|---|
| 2011/0216676 A1 | 9/2011 | Li |
| 2011/0261746 A1 | 10/2011 | Seo |
| 2014/0362832 A1* | 12/2014 | Rudolf ................. H04L 1/1822 370/336 |

FOREIGN PATENT DOCUMENTS

| | | |
|---|---|---|
| CN | 101827448 A | 9/2010 |
| CN | 101882985 A | 11/2010 |
| CN | 102201859 A | 9/2011 |
| CN | 102511189 A | 6/2012 |

OTHER PUBLICATIONS

International Search Report in international application No. PCT/CN2013/080968, mailed on Nov. 14, 2013.

English Translation of the Written Opinion of the International Search Authority in international application No. PCT/CN2013/080968, mailed on Nov. 14, 2013.

* cited by examiner

Fig.4

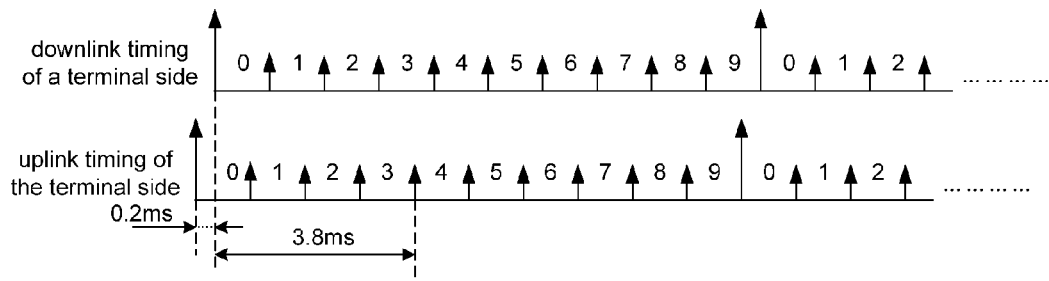

Fig.5

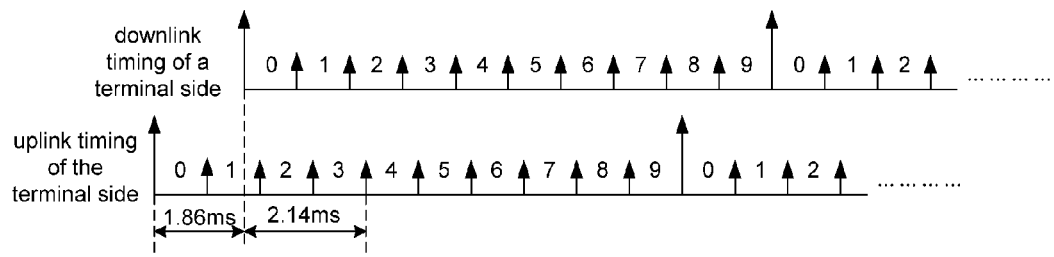

Fig.6

101. an uplink feedback sub-frame interval of a terminal side and an uplink feedback sub-frame interval of a base station side are increased

↓

102. after receiving uplink scheduling information transmitted by the base station side, the terminal side transmits data at a sub-frame with the increased uplink feedback sub-frame interval of the terminal side

↓

103. the terminal side receives data check information transmitted by the base station side at a sub-frame with the increased uplink feedback sub-frame interval of the base station side

LTE-BASED METHOD, SYSTEM, AND DEVICE FOR ULTRA-DISTANCE COVERAGE COMMUNICATION

TECHNICAL FIELD

The disclosure relates to technology of Long Term Evolution (LTE), and in particular to a method, system, and equipment for ultra-long-range coverage communication based on LTE.

BACKGROUND

LTE is regarded as "quasi-4G" with Orthogonal Frequency Division Multiplexing (OFDM)/Frequency Division Multiplexing Access (FDMA) at its core. Being good at providing higher data rate, improving cell capacity, reducing a system delay, supporting cell coverage with a maximum radius of 100 km, etc., as compared with 2G/3G technology, LTE is favoured by an increasing number of communication operators, and applies to fields including high-speed train communication and ground-to-air communication, such as an aircraft communications system.

In an LTE physical layer, an uplink synchronous Hybrid Automatic Repeat Request (HARQ) mechanism, where repeated data can be transmitted only on sub-frames with a fixed sub-frame interval, is employed. A downlink HARQ is asynchronous, that is, in each scheduling operation, a base side explicitly tells a terminal side an ID of a HARQ process to be used for flexible scheduling in retransmitting data.

There is a strict timing requirement during HARQ implementation.

FIG. 1 illustrates durations of a radio frame and sub-frames thereof. As can be seen, a radio frame has a duration Tf=10 ms, and includes 10 sub-frames, each having a duration T=1 ms.

FIG. 2 illustrates LTE Frequency Division Duplexing (FDD) uplink HARQ timing. Uplink scheduling information is transmitted at a sub-frame N, N being an integer ranging from 0 to 9. A base station side receives data transmitted by a terminal side at a sub-frame N+4 (i.e., sub-frame with a sub-frame interval of 4). The terminal side will receive check information fed back by the base station side, such as ACK/NACK information, at a sub-frame N+8 (i.e., sub-frame with a sub-frame interval of 8).

FIG. 3 illustrates LTE FDD downlink HARQ timing. A base station side transmits downlink scheduling information at a sub-frame N, receives check information fed back by a terminal side at a sub-frame N+4 (i.e., sub-frame with a sub-frame interval of 4), and can transmit repeated data as early as at a sub-frame N+8 (i.e., sub-frame with a sub-frame interval of 8).

In an LTE system, timing of a terminal side has to be consistent with that of a base station side. To make up for a signal transmission delay, uplink processing at a terminal side has to be performed in advance to ensure consistency in air interface timing. A lead in terminal side uplink processing depends primarily on a distance of a terminal side to a base station side. The greater the distance, the greater the lead.

FIG. 4 illustrates an ideal LTE FDD system (i.e. with no signal transmission delay) with a hardware processing delay of 0.2 ms, i.e., a difference of 0.2 ms between uplink processing timing and downlink processing timing of a terminal side. As can be seen from FIG. 4, time elapsed since the terminal side receives data till processing completes is 3.8 ms.

FIG. 5 illustrates a relationship between LTE FDD uplink processing timing and LTE FDD downlink processing timing of a terminal side with an ultra-long range of 250 km, a hardware processing delay of 0.2 ms, and a signal transmission delay of about 1.66 ms. Thus, an uplink lead of the terminal side is 1.86 ms, while time elapsed since the terminal side receives data till processing completes is reduced to 2.14 ms.

It thus can be seen that, for communication with ultra-long-range coverage (with a radius greater than 100 km), such as in a transoceanic international airline or an airline across an uninhabited desert or forest, to meet a system HARQ processing timing requirement, actual processing time of a terminal side reduces with an increasing propagation distance. Therefore, to cope with a reduced processing time of a terminal side, input cost has to be increased to improve processing capability of the terminal side. However, as the processing time reduces, it is inevitable that processing required will go beyond the processing capability of the terminal side, leading to malfunction of the entire system. In view of this, there is a pressing need for a solution for implementing communication of ultra-long-range coverage using LTE technology.

SUMMARY

In view of this, it is desired that embodiments of the disclosure provide a method, system and equipment for ultra-long-range coverage communication based on LTE, capable of providing an effective HARQ repeat mechanism for ultra-long-range coverage communication based on LTE.

Embodiments of the disclosure provide a method for ultra-long-range coverage communication based on Long Term Evolution (LTE), including:

increasing an uplink feedback sub-frame interval of a terminal side and an uplink feedback sub-frame interval of a base station side;

after receiving uplink scheduling information transmitted by the base station side, transmitting, by the terminal side, data at a sub-frame with the increased uplink feedback sub-frame interval of the terminal side; and receiving, by the terminal side, data check information transmitted by the base station side at a sub-frame with the increased uplink feedback sub-frame interval of the base station side.

The uplink feedback sub-frame interval of the terminal side and the uplink feedback sub-frame interval of the base station side may be increased by: increasing, according to a maximum radius of LTE ultra-long-range communication coverage, the uplink feedback sub-frame interval of the terminal side and the uplink feedback sub-frame interval of the base station side to be respectively greater than those in case that a maximum radius of LTE communication coverage is less than or equal to 100 km.

The maximum radius of LTE ultra-long-range communication coverage may be greater than 100 km.

The uplink feedback sub-frame interval of the terminal side and the uplink feedback sub-frame interval of the base station side may be increased by: for LTE Frequency Division Duplexing (FDD) uplink Hybrid Automatic Repeat Request (HARQ) timing, increasing the uplink feedback sub-frame interval of the terminal side from 4 to 4+M, and increasing the uplink feedback sub-frame interval of the base station side from 8 to 8+H. The M and the H may be positive integers. The H may be greater than or equal to the M.

After receiving the uplink scheduling information transmitted by the base station side, the terminal side may transmit data at a sub-frame with the increased uplink feedback sub-frame interval of the terminal side by: after receiving the uplink scheduling information transmitted by the base station side at a sub-frame N, transmitting, by the terminal side, the data at a sub-frame N+4+M.

The terminal side may receive the data check information transmitted by the base station side at the sub-frame with the increased uplink feedback sub-frame interval of the base station side by: receiving, by the terminal side, the data check information transmitted by the base station side at a sub-frame N+8+H.

A downlink feedback sub-frame interval of the terminal side and a downlink feedback sub-frame interval of the base station side may be increased. After receiving downlink scheduling information transmitted by the base station side, the terminal side may feed back check information at a sub-frame with the increased downlink feedback sub-frame interval of the terminal side. The terminal side may receive repeated data or new data transmitted by the base station side at a sub-frame with the increased downlink feedback sub-frame interval of the base station side.

The downlink feedback sub-frame interval of the terminal side and the downlink feedback sub-frame interval of the base station side may be increased by: increasing, according to a maximum radius of LTE ultra-long-range communication coverage, the downlink feedback sub-frame interval of the terminal side and the downlink feedback sub-frame interval of the base station side to be respectively greater than those in case that a maximum radius of LTE communication coverage is less than or equal to 100 km.

The maximum radius of LTE ultra-long-range communication coverage may be greater than 100 km.

The downlink feedback sub-frame interval of the terminal side and the downlink feedback sub-frame interval of the base station side may be increased by: for LTE Frequency Division Duplexing (FDD) downlink Hybrid Automatic Repeat Request (HARQ) timing, increasing a number of downlink HARQ processes from 8 to 8+L, increasing the downlink feedback sub-frame interval of the terminal side from 4 to 4+L1, and increasing the downlink feedback sub-frame interval of the base station side from 8 to 8+L2. The L, the L1 and the L2 may be positive integers. L may be equal to L2. The L2 may be greater than or equal to the L1.

After receiving the downlink scheduling information transmitted by the base station side, the terminal side may feed back the check information at the sub-frame with the increased downlink feedback sub-frame interval of the terminal side by: after receiving the downlink scheduling information transmitted by the base station side at a sub-frame N, feeding back the check information at a sub-frame N+4+L1.

The repeated data or the new data transmitted by the base station side at the sub-frame with the increased downlink feedback sub-frame interval of the base station side may be received by: receiving the repeated data or the new data transmitted by the base station side at a sub-frame N+8+L2.

An embodiment of the disclosure provides a system for ultra-long-range coverage communication based on Long Term Evolution (LTE), including a terminal side and a base station side.

The terminal side is configured for: increasing an uplink feedback sub-frame interval of the terminal side, and after receiving uplink scheduling information transmitted by the base station side, transmitting data at a sub-frame with the increased uplink feedback sub-frame interval of the terminal side.

The base station side is configured for: increasing an uplink feedback sub-frame interval of the base station side, transmitting the uplink scheduling information, receiving the data transmitted by the terminal side at a sub-frame with the increased uplink feedback sub-frame interval of the terminal side, and transmitting data check information at a sub-frame with the increased uplink feedback sub-frame interval of the base station side.

The terminal side is further configured for: receiving the data check information transmitted by the base station side at the sub-frame with the increased uplink feedback sub-frame interval of the base station side.

The terminal side may include a first uplink receiving module and a first uplink transmitting module.

The first uplink receiving module may be configured for receiving the uplink scheduling information transmitted by the base station side and the data check information transmitted by the base station side at the sub-frame with the increased uplink feedback sub-frame interval of the base station side.

The first uplink transmitting module may be configured for: after the first uplink receiving module receives the uplink scheduling information transmitted by the base station side, transmitting the data at the sub-frame with the increased uplink feedback sub-frame interval of the terminal side.

The base station side may include a second uplink receiving module and a second uplink transmitting module.

The second uplink receiving module may be configured for receiving the data transmitted by the terminal side at the sub-frame with the increased uplink feedback sub-frame interval of the terminal side.

The second uplink transmitting module may be configured for transmitting the uplink scheduling information and transmitting the data check information at the sub-frame with the increased uplink feedback sub-frame interval of the base station side.

In the system, a downlink feedback sub-frame interval of the terminal side and a downlink feedback sub-frame interval of the base station side may be respectively greater than a downlink feedback sub-frame interval of the terminal side and a downlink feedback sub-frame interval of the base station side in case that a maximum radius of LTE communication coverage is less than or equal to 100 km.

The terminal side may further include a first downlink receiving module and a first downlink transmitting module.

The first downlink receiving module may be configured for receiving downlink scheduling information transmitted by the base station side and receiving repeated data or new data transmitted by the base station side at a sub-frame with the increased downlink feedback sub-frame interval of the base station side.

The first downlink transmitting module may be configured for: after the first downlink receiving module receives the downlink scheduling information transmitted by the base station side, feeding back check information at a sub-frame with the increased downlink feedback sub-frame interval of the terminal side.

The base station side may further include a second downlink receiving module and a second downlink transmitting module.

The second downlink receiving module may be configured for receiving the check information fed back by the terminal side at the sub-frame with the increased downlink feedback sub-frame interval of the terminal side.

The second downlink transmitting module may be configured for transmitting the downlink scheduling information and transmitting the repeated data or the new data at the sub-frame with the increased downlink feedback sub-frame interval of the base station side.

An embodiment of the disclosure provides a terminal side including a first uplink receiving module and a first uplink transmitting module.

The first uplink receiving module may be configured for receiving uplink scheduling information transmitted by a base station side and data check information transmitted by the base station side at a sub-frame with an increased uplink feedback sub-frame interval of the base station side.

The first uplink transmitting module may be configured for: after the first uplink receiving module receives the uplink scheduling information transmitted by the base station side, transmitting data at a sub-frame with an increased uplink feedback sub-frame interval of the terminal side.

An embodiment of the disclosure provides a base station side including a second uplink receiving module and a second uplink transmitting module.

The second uplink receiving module may be configured for receiving data transmitted by a terminal side at a sub-frame with an increased uplink feedback sub-frame interval of the terminal side.

The second uplink transmitting module may be configured for transmitting uplink scheduling information and transmitting data check information at a sub-frame with an increased uplink feedback sub-frame interval of the base station side.

Embodiments of the disclosure provide a method, system and equipment for ultra-long-range coverage communication based on LTE, capable of increasing HARQ processing time of a terminal side, reducing a requirement on processing capability of the terminal side, and providing an effective HARQ repeat mechanism for ultra-long-range coverage communication based on LTE.

BRIEF DESCRIPTION OF THE DRAWINGS

FIG. 4 is a diagram of the relationship between uplink timing and downlink timing of a terminal side in an ideal LTE FDD system in related art;

FIG. 5 is a diagram of the relationship between uplink timing and downlink timing of a terminal side in an LTE FDD system with an ultra-long range of 250 km in related art;

FIG. 6 is a flow chart of a method for implementing ultra-long-range coverage communication based on LTE according to an embodiment of the disclosure;

DETAILED DESCRIPTION

Figure 1:
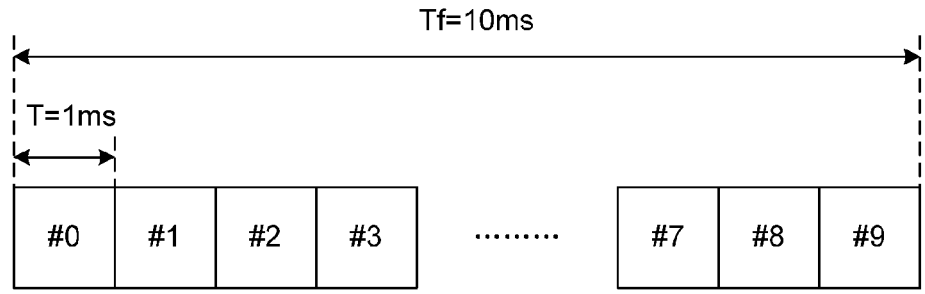
FIG. 1 is a diagram of durations of a radio frame and sub-frames thereof in related art.
Figure 2:
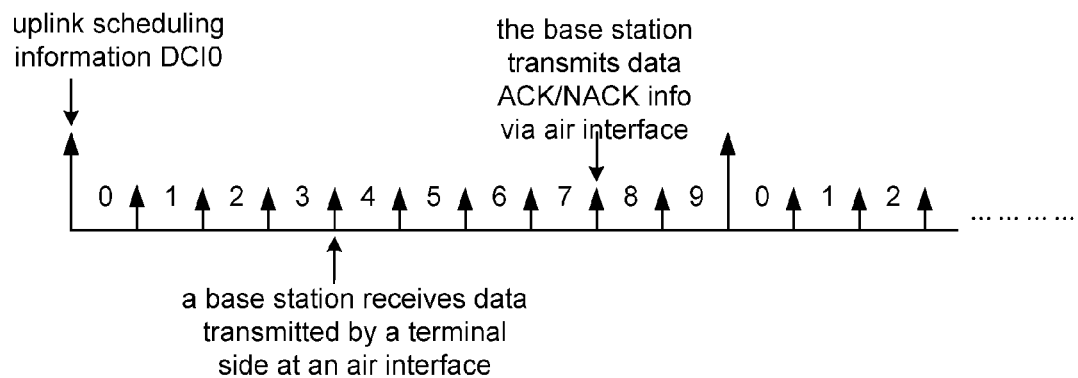
FIG. 2 is a diagram of LTE FDD uplink HARQ timing in related art.
Figure 3:
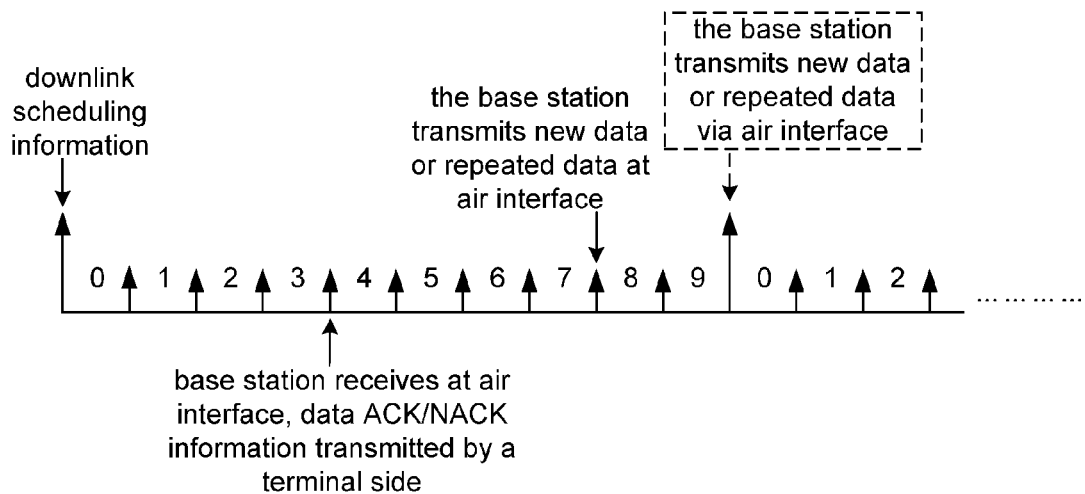
FIG. 3 is a diagram of LTE FDD downlink HARQ timing in related art.

Embodiments of the disclosure will be elaborated below with reference to the accompanying drawings. Note that embodiments of the disclosure and features in the embodiments can be combined with each other in any manner as long as there is no conflict.

In embodiments of the disclosure, an uplink feedback sub-frame interval of a terminal side and an uplink feedback sub-frame interval of a base station side are increased. After receiving uplink scheduling information transmitted by the base station side, the terminal side transmits data at a sub-frame with the increased uplink feedback sub-frame interval of the terminal side, and receives data check information transmitted by the base station side at a sub-frame with the increased uplink feedback sub-frame interval of the base station side.

A method for ultra-long-range coverage communication based on LTE is implemented in embodiments of the disclosure. As shown in FIG. 6, the method may include steps as follows.

In Step 101, an uplink feedback sub-frame interval of a terminal side and an uplink feedback sub-frame interval of a base station side are increased.

In this step, the uplink feedback sub-frame interval of the terminal side and the uplink feedback sub-frame interval of the base station side may be increased beforehand, according to a maximum radius of LTE ultra-long-range communication coverage, to be respectively greater than those in case that a maximum radius of LTE communication coverage is less than or equal to 100 km. The maximum radius of LTE ultra-long-range communication coverage may be greater than 100 km.

For LTE FDD uplink HARQ timing, the uplink feedback sub-frame interval of the terminal side may be increased from 4 to 4+M, and the uplink feedback sub-frame interval of the base station side may be increased from 8 to 8+H, wherein the M and the H are positive integers, and the H may be greater than or equal to the M. The M and the H are determined by the maximum radius of communication coverage. The greater the maximum radius of communication coverage, the greater the M and the H are.

In Step 102, after receiving uplink scheduling information transmitted by the base station side, the terminal side transmits data at a sub-frame with the increased uplink feedback sub-frame interval of the terminal side.

In this step, after receiving the uplink scheduling information transmitted by the base station side at a sub-frame N, the terminal side may transmit the data at a sub-frame N+4+M.

In Step 103, the terminal side receives data check information transmitted by the base station side at a sub-frame with the increased uplink feedback sub-frame interval of the base station side.

In this step, the terminal side may receive the data check information transmitted by the base station side at a sub-frame N+8+H.

In the method, a downlink feedback sub-frame interval of the terminal side and a downlink feedback sub-frame interval of the base station side may be increased. After receiving downlink scheduling information transmitted by the base station side, the terminal side may feed back check information at a sub-frame with the increased downlink feedback sub-frame interval of the terminal side, and receive repeated data or new data transmitted by the base station side at a sub-frame with the increased downlink feedback sub-frame interval of the base station side.

The downlink feedback sub-frame interval of the terminal side and the downlink feedback sub-frame interval of the base station side may be increased by: increasing in advance, according to a maximum radius of LTE ultra-long-range communication coverage, the downlink feedback sub-frame interval of the terminal side and the downlink feedback sub-frame interval of the base station side to be respectively greater than those in case that a maximum radius of LTE communication coverage is less than or equal to 100 km. The maximum radius of LTE ultra-long-range communication coverage is greater than 100 km.

Generally, for LTE FDD downlink HARQ timing, a number of downlink HARQ processes may be increased from 8 to 8+L, the downlink feedback sub-frame interval of the terminal side may be increased from 4 to 4+L1, and the downlink feedback sub-frame interval of the base station side may be increased from 8 to 8+L2. The L, the L1 and the L2 are positive integers. L=L2, and the L2 is greater than or equal to the L1. The L, the L1 and the L2 are determined by the maximum radius of communication coverage. The greater the maximum radius of communication coverage, the greater the L, the L1 and the L2 are.

After receiving the downlink scheduling information transmitted by the base station side, the terminal side may feed back the check information at the sub-frame with the increased downlink feedback sub-frame interval of the terminal side by feeding back the check information at a sub-frame N+4+L1 after receiving the downlink scheduling information transmitted by the base station side at a sub-frame N.

The terminal side may receive the repeated data or the new data transmitted by the base station side at the sub-frame with the increased downlink feedback sub-frame interval of the base station side by receiving the repeated data or the new data transmitted by the base station side at a sub-frame N+8+L2.

Figure 7:
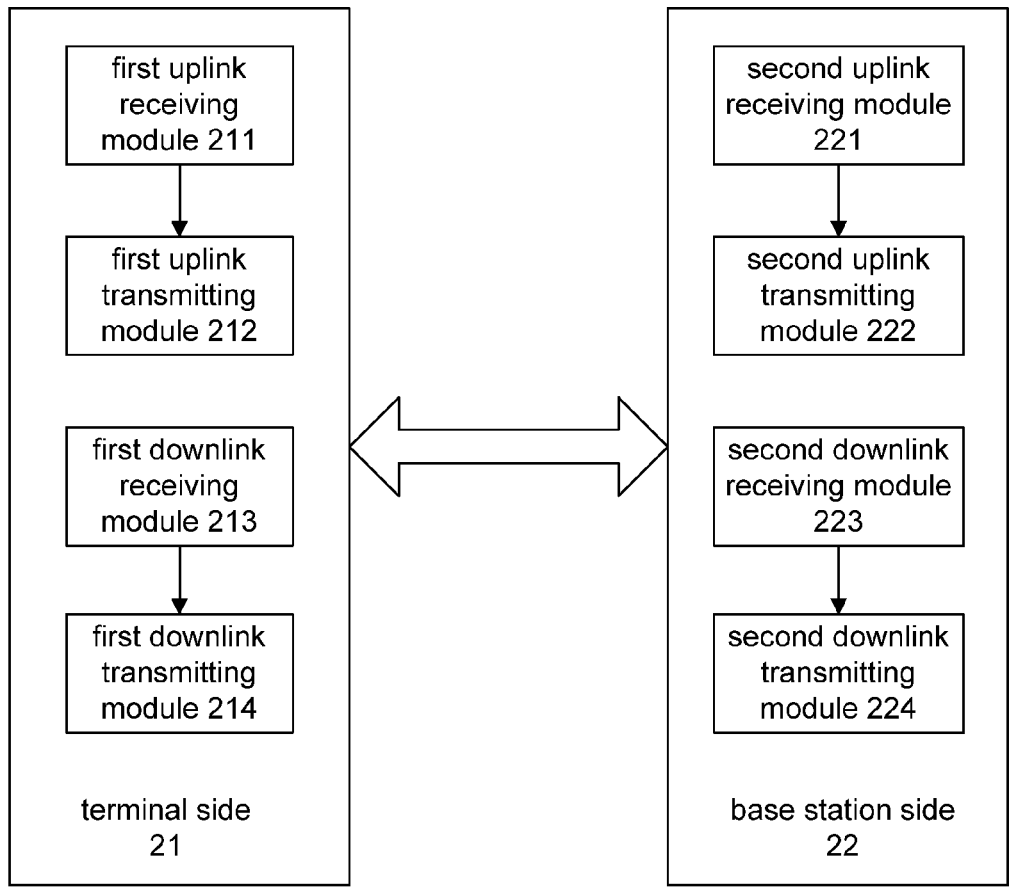
FIG. 7 is a diagram of a structure of a system for implementing ultra-long-range coverage communication based on LTE according to an embodiment of the disclosure.

To implement the method, embodiments of the disclosure further provide a system for ultra-long-range coverage communication based on LTE. As shown in FIG. 7, in the system, an uplink feedback sub-frame interval of a terminal side and an uplink feedback sub-frame interval of a base station side are increased beforehand. The system includes a terminal side 21 and a base station side 22.

The terminal side 21 is configured for: after receiving uplink scheduling information transmitted by the base station side 22, transmitting data at a sub-frame with the increased uplink feedback sub-frame interval of the terminal side; and receiving data check information transmitted by the base station side 22 at a sub-frame with the increased uplink feedback sub-frame interval of the base station side.

The base station side 22 is configured for: transmitting the uplink scheduling information, receiving the data transmitted by the terminal side 21 at a sub-frame with the increased uplink feedback sub-frame interval of the terminal side, and transmitting data check information at a sub-frame with the increased uplink feedback sub-frame interval of the base station side.

The terminal side 21 may include a first uplink receiving module 211 and a first uplink transmitting module 212.

The first uplink receiving module 211 may be configured for receiving the uplink scheduling information transmitted by the base station side 22 and the data check information transmitted by the base station side at the sub-frame with the increased uplink feedback sub-frame interval of the base station side.

The first uplink transmitting module 212 may be configured for: after the first uplink receiving module 211 receives the uplink scheduling information transmitted by the base station side 22, transmitting the data at the sub-frame with the increased uplink feedback sub-frame interval of the terminal side.

The base station side 22 may include a second uplink receiving module 221 and a second uplink transmitting module 222.

The second uplink receiving module 221 may be configured for receiving the data transmitted by the terminal side 21 at the sub-frame with the increased uplink feedback sub-frame interval of the terminal side.

The second uplink transmitting module 222 may be configured for transmitting the uplink scheduling information, and transmitting the data check information at the sub-frame with the increased uplink feedback sub-frame interval of the base station side.

The uplink feedback sub-frame interval of the terminal side and the uplink feedback sub-frame interval of the base station side may be increased beforehand by: increasing in advance, according to a maximum radius of LTE ultra-long-range communication coverage, the uplink feedback sub-frame interval of the terminal side and the uplink feedback sub-frame interval of the base station side to be respectively greater than those in case that a maximum radius of LTE communication coverage is less than or equal to 100 km. The maximum radius of LTE ultra-long-range communication coverage is greater than 100 km.

The increased uplink feedback sub-frame interval of the terminal side may be 4+M. The increased uplink feedback sub-frame interval of the base station side may be 8+H. The M and the H are positive integers. The H is greater than or equal to the M. The M and the H are determined by the maximum radius of communication coverage. The greater the maximum radius of communication coverage, the greater the M and the H are.

In an embodiment of the system, a number of downlink HARQ processes may also be increased in advance. In addition, the downlink feedback sub-frame intervals of the terminal side and of the base station may be increased.

The terminal side 21 may further include a first downlink receiving module 213 and a first downlink transmitting module 214.

The first downlink receiving module 213 may be configured for receiving downlink scheduling information transmitted by the base station side 22 and receiving repeated data or new data transmitted by the base station side 22 at a sub-frame with an increased downlink feedback sub-frame interval of the base station side.

The first downlink transmitting module 214 may be configured for: after the first downlink receiving module 213 receives the downlink scheduling information transmitted by the base station side 22, feeding back check information at a sub-frame with an increased downlink feedback sub-frame interval of the terminal side.

The base station side 22 may further include a second downlink receiving module 223 and a second downlink transmitting module 224.

The second downlink receiving module 223 may be configured for receiving check information fed back by the terminal side 21 at a sub-frame with an increased downlink feedback sub-frame interval of the terminal side.

The second downlink transmitting module 224 may be configured for transmitting downlink scheduling information, and transmitting repeated data or new data at a sub-frame with an increased downlink feedback sub-frame interval of the base station side.

The downlink feedback sub-frame interval of the terminal side and the downlink feedback sub-frame interval of the base station side may be increased by: increasing in advance, according to a maximum radius of LTE ultra-long-range communication coverage, the downlink feedback sub-frame interval of the terminal side and the downlink feedback sub-frame interval of the base station side to be respectively greater than those in case that a maximum radius of LTE communication coverage is less than or equal to 100 km. The maximum radius of LTE ultra-long-range communication coverage is greater than 100 km.

The number of downlink HARQ processes may be increased from 8 to 8+L. The increased downlink feedback sub-frame interval of the terminal side may be 4+L1. The increased downlink feedback sub-frame interval of the base station side may be 8+L2. The L, the L1 and the L2 are positive integers. L=L2, and the L2 is greater than or equal to the L1. The L, the L1 and the L2 are determined by the maximum radius of communication coverage. The greater the maximum radius of communication coverage, the greater the L, the L1 and the L2 are.

According to the system, a terminal side is also provided by embodiments of the disclosure. As shown in FIG. 7, an uplink feedback sub-frame interval of the terminal side and an uplink feedback sub-frame interval of a base station side are increased beforehand. The terminal side 21 includes a first uplink receiving module 211 and a first uplink transmitting module 212.

The first uplink receiving module 211 is configured for receiving uplink scheduling information transmitted by the base station side 22 and data check information transmitted by the base station side at a sub-frame with the increased uplink feedback sub-frame interval of the base station side.

The first uplink transmitting module 212 is configured for: after the first uplink receiving module 211 receives the uplink scheduling information transmitted by the base station side 22, transmitting data at a sub-frame with the increased uplink feedback sub-frame interval of the terminal side.

The uplink feedback sub-frame interval of the terminal side and the uplink feedback sub-frame interval of the base station side may be increased beforehand by: increasing in advance, according to a maximum radius of LTE ultra-long-range communication coverage, the uplink feedback sub-frame interval of the terminal side and the uplink feedback sub-frame interval of the base station side to be respectively greater than those in case that a maximum radius of LTE communication coverage is less than or equal to 100 km. The maximum radius of LTE ultra-long-range communication coverage is greater than 100 km.

The increased uplink feedback sub-frame interval of the terminal side may be 4+M. The increased uplink feedback sub-frame interval of the base station side may be 8+H. The M and the H are positive integers. The H is greater than or equal to the M. The M and the H are determined by the maximum radius of communication coverage. The greater the maximum radius of communication coverage, the greater the M and the H are.

In an embodiment of the system, a number of downlink HARQ processes may also be increased beforehand. In addition, the downlink feedback sub-frame intervals of the terminal side and of the base station may be increased.

The terminal side 21 may further include a first downlink receiving module 213 and a first downlink transmitting module 214.

The first downlink receiving module 213 may be configured for receiving downlink scheduling information transmitted by the base station side 22 and receiving repeated data or new data transmitted by the base station side 22 at a sub-frame with an increased downlink feedback sub-frame interval of the base station side.

The first downlink transmitting module 214 may be configured for: after the first downlink receiving module 213 receives the downlink scheduling information transmitted by the base station side 22, feeding back check information at a sub-frame with an increased downlink feedback sub-frame interval of the terminal side.

The downlink feedback sub-frame interval of the terminal side and the downlink feedback sub-frame interval of the base station side may be increased by: increasing in advance, according to a maximum radius of LTE ultra-long-range communication coverage, the downlink feedback sub-frame interval of the terminal side and the downlink feedback sub-frame interval of the base station side to be respectively greater than those in case that a maximum radius of LTE communication coverage is less than or equal to 100 km. The maximum radius of LTE ultra-long-range communication coverage is greater than 100 km.

The number of downlink HARQ processes may be increased from 8 to 8+L. The increased downlink feedback sub-frame interval of the terminal side may be 4+L1. The increased downlink feedback sub-frame interval of the base station side may be 8+L2. The L, the L1 and the L2 are positive integers. L=L2, and the L2 is greater than or equal to the L1. The L, the L1 and the L2 are determined by the maximum radius of communication coverage. The greater the maximum radius of communication coverage, the greater the L, the L1 and the L2 are.

According to the system, a base station side is further provided by embodiments of the disclosure. As shown in FIG. 7, an uplink feedback sub-frame interval of a terminal side and an uplink feedback sub-frame interval of the base station side are increased beforehand. The base station side 22 includes a second uplink receiving module 221 and a second uplink transmitting module 222.

The second uplink receiving module 221 is configured for receiving data transmitted by the terminal side 21 at a sub-frame with the increased uplink feedback sub-frame interval of the terminal side.

The second uplink transmitting module 222 is configured for transmitting uplink scheduling information, and transmitting data check information at a sub-frame with the increased uplink feedback sub-frame interval of the base station side.

The uplink feedback sub-frame interval of the terminal side and the uplink feedback sub-frame interval of the base station side may be increased beforehand by: increasing in advance, according to a maximum radius of LTE ultra-long-range communication coverage, the uplink feedback sub-frame interval of the terminal side and the uplink feedback sub-frame interval of the base station side to be respectively greater than those in case that a maximum radius of LTE communication coverage is less than or equal to 100 km. The maximum radius of LTE ultra-long-range communication coverage is greater than 100 km.

The increased uplink feedback sub-frame interval of the terminal side may be 4+M. The increased uplink feedback sub-frame interval of the base station side may be 8+H. The M and the H are positive integers. The H is greater than or equal to the M. The M and the H are determined by the maximum radius of communication coverage. The greater the maximum radius of communication coverage, the greater the M and the H are.

In an embodiment of the system, a number of downlink HARQ processes may also be increased beforehand. In addition, the downlink feedback sub-frame intervals of the terminal side and of the base station may be increased.

The base station side 22 may further include a second downlink receiving module 223 and a second downlink transmitting module 224.

The second downlink receiving module 223 may be configured for receiving check information fed back by the terminal side 21 at a sub-frame with an increased downlink feedback sub-frame interval of the terminal side.

The second downlink transmitting module 224 may be configured for transmitting downlink scheduling information, and transmitting repeated data or new data at a sub-frame with an increased downlink feedback sub-frame interval of the base station side.

The downlink feedback sub-frame interval of the terminal side and the downlink feedback sub-frame interval of the base station side may be increased by: increasing in advance, according to a maximum radius of LTE ultra-long-range communication coverage, the downlink feedback sub-frame interval of the terminal side and the downlink feedback sub-frame interval of the base station side to be respectively greater than those in case that a maximum radius of LTE communication coverage is less than or equal to 100 km. The maximum radius of LTE ultra-long-range communication coverage is greater than 100 km.

The number of downlink HARQ processes may be increased from 8 to 8+L. The increased downlink feedback sub-frame interval of the terminal side may be 4+L1. The increased downlink feedback sub-frame interval of the base station side may be 8+L2. The L, the L1 and the L2 are positive integers. L=L2, and the L2 is greater than or equal to the L1. The L, the L1 and the L2 are determined by the maximum radius of communication coverage. The greater the maximum radius of communication coverage, the greater the L, the L1 and the L2 are.

Implementation of the disclosure is elaborated below with application examples.

Application Example 1

In the example, LTE FDD is employed, a radius of cell coverage is 250 km, and a signal transmission delay is about 1.66 ms.

A normal processing timing of a terminal side is shown in FIG. 5. A hardware processing delay of the terminal is set as 0.2 ms. As to uplink timing of the terminal side, processing will be performed with a lead of 1.86 ms. Processing time of the terminal side is reduced to 2.14 ms, of which 1 ms is required for completing data reception. Therefore, actual processing time of the terminal side is around 1.14 ms.

Figure 8:
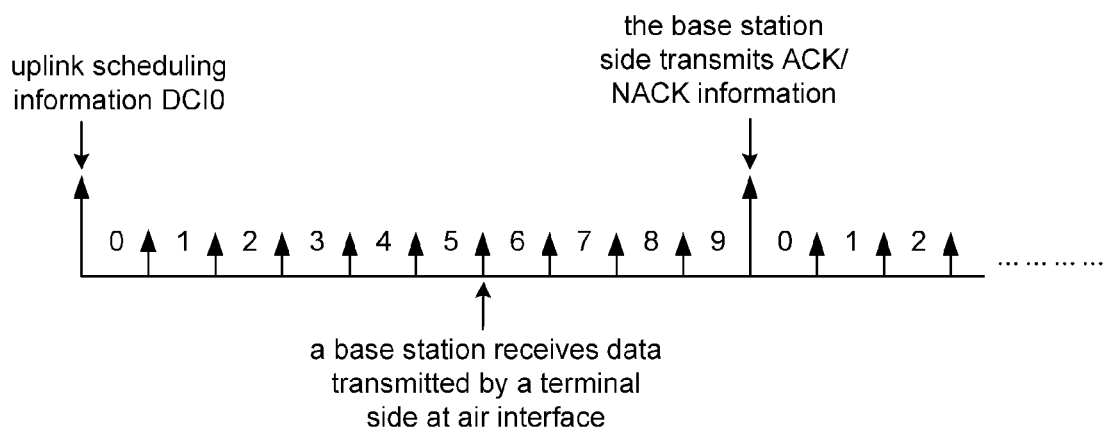
FIG. 8 is a diagram of uplink HARQ timing according to example 1 of applying the disclosure.
Figure 9:
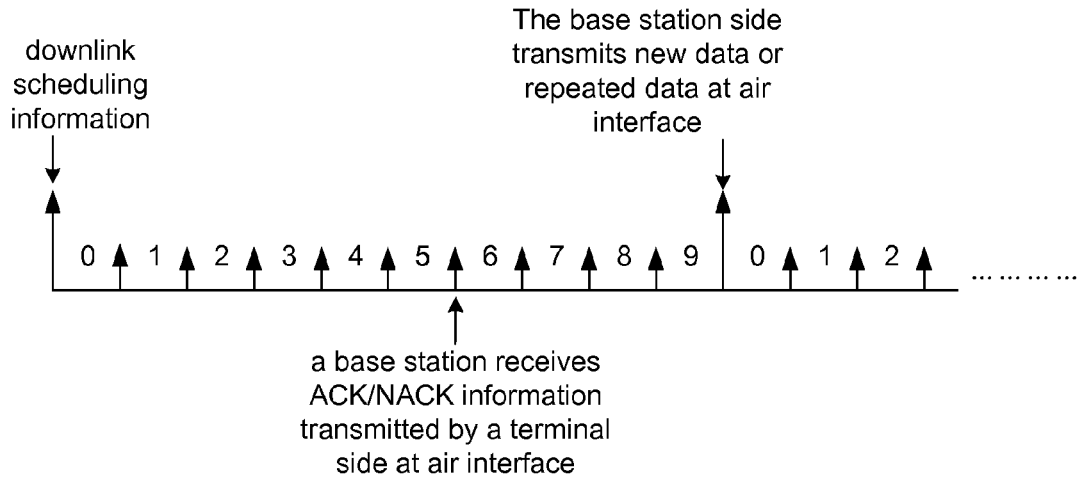
FIG. 9 is a diagram of downlink HARQ timing according to example 1 of applying the disclosure.

With the method of the example, an uplink feedback sub-frame interval of the terminal side is modified from 4 to 6 (i.e., M=2). An uplink feedback sub-frame interval of a base station side is modified from 8 to 10 (i.e., H=2). Uplink HARQ timing after the increase is shown in FIG. 8. The base station side transmits uplink scheduling information DCI0 at sub-frame 0. The terminal side transmits data at sub-frame 6. The base station side receives the data at an air interface, and transmits ACK/NACK information at sub-frame 0 of the next frame. Likewise, a number of downlink HARQ processes is modified from 8 to 10 (i.e., L=2). The downlink feedback sub-frame interval of the terminal side is modified from 4 to 6 (i.e., L1=2). The downlink feedback sub-frame interval of the base station is modified from 8 to 10 (i.e., L2=2). Downlink HARQ timing after the modification is shown in FIG. 9. The base station side transmits downlink scheduling information at sub-frame 0 via an air interface. The terminal side transmits ACK/NACK information at sub-frame 6. The base station side receives the ACK/NACK information at an air interface, and transmits repeated data or new data at sub-frame 0 of the next frame.

Figure 10:
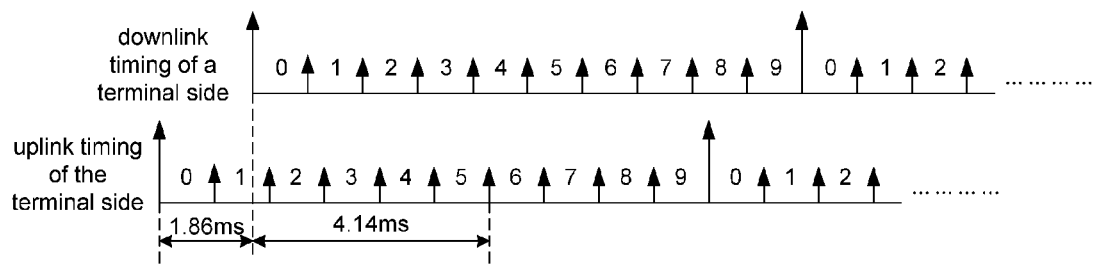
FIG. 10 is a diagram of uplink and downlink timing of a terminal side according to example 1 of applying the disclosure.

Here, after the HARQ timing modification, processing timing of the terminal side is as shown in FIG. 10. The uplink lead of the terminal side remains to be 1.86 ms. Compared with the case prior to the modification, the processing time of the terminal increases from 2.14 ms to 4.14 ms, which fundamentally solves the issue of a reduced processing time of a terminal side.

Application Example 2

In the example, LTE FDD is employed, a radius of cell coverage is 150 km, a signal transmission delay is 1 ms, and a hardware processing delay of a terminal is set as 0.2 ms.

Figure 11:
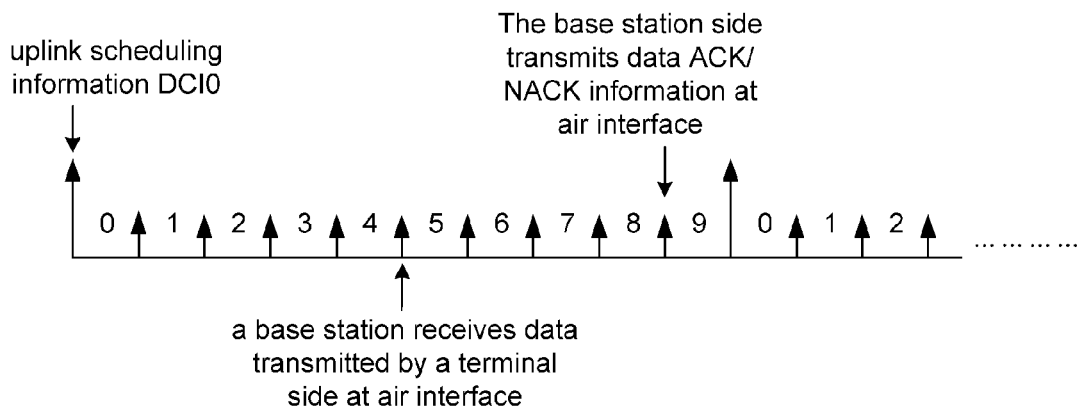
FIG. 11 is a diagram of uplink HARQ timing according to example 2 of applying the disclosure.
Figure 12:
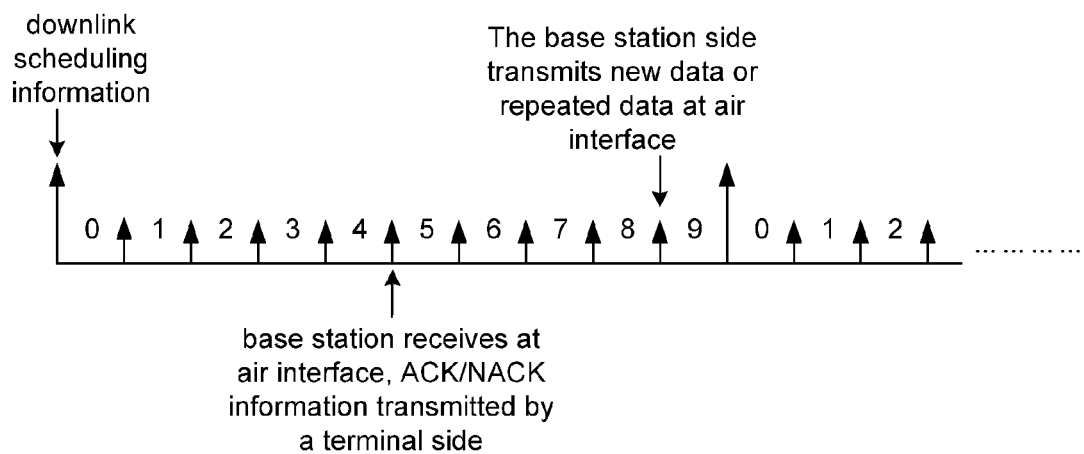
FIG. 12 is a diagram of downlink HARQ timing according to example 2 of applying the disclosure.

In view of the radius of cell coverage and the signal transmission delay, an uplink HARQ feedback sub-frame interval of the terminal side is modified from 4 to 5 (i.e., M=1). An uplink feedback sub-frame interval of a base station side is modified from 8 to 9 (i.e., H=1). Uplink HARQ timing after the increase is shown in FIG. 11. The base station side transmits uplink scheduling information DCI0 at sub-frame 0. The terminal side transmits data at sub-frame 5. The base station side receives the data at an air interface, and transmits ACK/NACK information at sub-frame 9. Likewise, a number of downlink HARQ processes is modified from 8 to 9 (i.e., L=1). The downlink feedback sub-frame interval of the terminal side is modified from 4 to 5 (i.e., L1=1). The downlink feedback sub-frame interval of the base station is modified from 8 to 9 (i.e., L2=1). Downlink HARQ timing after the modification is shown in FIG. 12. The base station side transmits downlink scheduling information at sub-frame 0 via an air interface. The terminal side transmits ACK/NACK information at sub-frame 5. The base station side receives the ACK/NACK information at an air interface, and transmits repeated data or new data at sub-frame 9.

Figure 13:
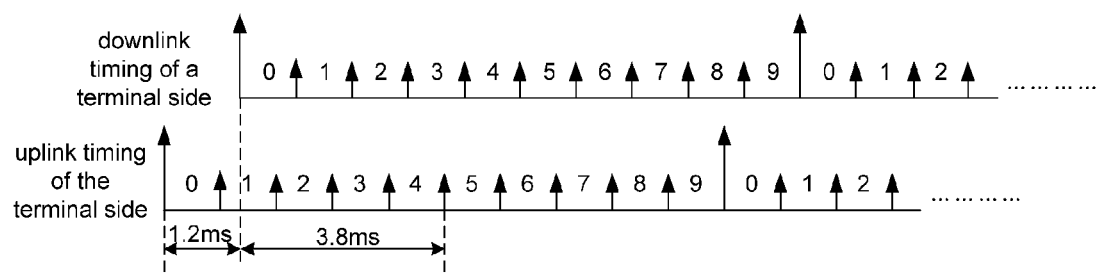
FIG. 13 is a diagram of uplink and downlink timing of a terminal side according to example 2 of applying the disclosure.

Here, processing timing of the terminal side is as shown in FIG. 13. As can be seen clearly, reduction of 1 ms in processing time of the terminal side due to the transmission delay is made up, thereby ensuring a normal processing operation of the terminal side.

What described are merely embodiments of the disclosure, and are not intended to limit the scope of the disclosure.

One of ordinary skill in the art will appreciate that all or part of the method can be implemented by instructing related hardware through a program. Such a program can be stored in non-transitory computer-readable storage media such as a Read-Only Memory, a magnetic disk, an optical disk, and the like. Alternatively, all or part of the embodiments may also be implemented by using one or more integrated circuits. Correspondingly, each module/unit in the embodiments may be implemented in form of hardware or a software functional module. The disclosure is not limited to any combination of hardware and software of a particular form.

INDUSTRIAL APPLICABILITY

With embodiments of the disclosure, it is possible to increase HARQ processing time of a terminal side, reducing a requirement on processing capability of the terminal side, and providing an effective HARQ repeat mechanism for ultra-long-range coverage communication based on LTE.

The invention claimed is:

1. A method for ultra-long-range coverage communication based on Long Term Evolution (LTE), comprising:
   increasing, according to a maximum radius of LTE ultra-long-range communication coverage, an uplink feedback sub-frame interval of a terminal side and an uplink feedback sub-frame interval of a base station side;
   after receiving uplink scheduling information transmitted by the base station side, transmitting, by the terminal side, data at a sub-frame with the increased uplink feedback sub-frame interval of the terminal side; and
   receiving, by the terminal side, data check information transmitted by the base station side at a sub-frame with the increased uplink feedback sub-frame interval of the base station side.

2. The method according to claim 1, wherein the increasing an uplink feedback sub-frame interval of a terminal side and an uplink feedback sub-frame interval of a base station side comprises: increasing, according to a maximum radius of LTE ultra-long-range communication coverage, the uplink feedback sub-frame interval of the terminal side and the uplink feedback sub-frame interval of the base station side to be respectively greater than those in case that a maximum radius of LTE communication coverage is less than or equal to 100 km,
   wherein the maximum radius of LTE ultra-long-range communication coverage is greater than 100 km.

3. The method according to claim 1, wherein the increasing an uplink feedback sub-frame interval of a terminal side and an uplink feedback sub-frame interval of a base station side comprises: for LTE Frequency Duplexing (FDD) uplink Hybrid Automatic Repeat Request (HARQ) timing, increasing the uplink feedback sub-frame interval of the terminal side from 4 sub-frames to 4+M sub-frames, and increasing the uplink feedback sub-frame interval of the base station side from 8 sub-frames to 8+H sub-frames, wherein the M and the H are positive integers, and the H is greater than equal to the M.

4. The method according to claim 3, wherein the after receiving uplink scheduling information transmitted by the base station side, transmitting, by the terminal side, data at a sub-frame with the increased uplink feedback sub-frame interval of the terminal side comprises: after receiving the uplink scheduling information transmitted by the base station side at a sub-frame N, transmitting, by the terminal side, the data at a sub-frame N+4+M.

5. The method according to claim 3, wherein the receiving, by the terminal side, data check information transmitted by the base station side at a sub-frame with the increased uplink feedback sub-frame interval of the base station side comprises: receiving, by the terminal side, the data check information transmitted by the base station side at a sub-frame N+8+H.

6. The method according to claim 1, further comprising: increasing a downlink feedback sub-frame interval of the terminal side and a downlink feedback sub-frame interval of the base station side; and after receiving downlink scheduling information transmitted by the base station side, feeding back, by the terminal side, check information at a sub-frame with the increased downlink feedback sub-frame interval of the terminal side, and receiving repeated data or new data transmitted by the base station side at a sub-frame with the increased downlink feedback sub-frame interval of the base station side.

7. The method according to claim 6, wherein the increasing a downlink feedback sub-frame interval of the terminal side and a downlink feedback sub-frame interval of the base station side comprises: increasing, according to a maximum radius of LTE ultra-long-range communication coverage, the downlink feedback sub-frame interval of the terminal side and the downlink feedback sub-frame interval of the base station side to be respectively greater than those in case that a maximum radius of LTE communication coverage is less than or equal to 100 km,
   wherein the maximum radius of LTE ultra-long-range communication coverage is greater than 100 km.

8. The method according to claim 6, wherein the increasing a downlink feedback sub-frame interval of the terminal side and a downlink feedback sub-frame interval of the base station side comprises: for LTE Frequency Division Duplexing (FDD) downlink Hybrid Automatic Repeat Request (HARQ) timing, increasing a number of downlink HARQ processes from 8 to 8+L, increasing the downlink feedback sub-frame interval of the terminal side from 4 sub-frames to 4+L1 sub-frames, and increasing the downlink feedback sub-frame interval of the base station side from 8 sub-frames to 8+L2 sub-frames, wherein the L, the L1 and the L2 are positive integers, L=L2, and the L2 is greater than or equal to the L1.

9. The method according to claim 8, wherein the after receiving downlink scheduling information transmitted by the base station side, feeding back, by the terminal side, check information at a sub-frame with the increased downlink feedback sub-frame interval of the terminal side comprises: after receiving the downlink scheduling information transmitted by the base station side at a sub-frame N, feeding back, by the terminal side, the check information at a sub-frame N+4+L1.

10. The method according to claim 8, wherein the receiving repeated data or new data transmitted by the base station side at a sub-frame with the increased downlink feedback sub-frame interval of the base station side comprises: receiving the repeated data or the new data transmitted by the base station side at a sub-frame N+8+L2.

11. A system for ultra-long-range coverage communication based on Long Term Evolution (LTE), comprising a terminal side and a base station side, wherein
   the terminal side is configured for: increasing, according to a maximum radius of LTE ultra-long-range communication coverage, an uplink feedback sub-frame interval of the terminal side, and after receiving uplink scheduling information transmitted by the base station side, transmitting data at a sub-frame with the increased uplink feedback sub-frame interval of the terminal side; and
   the base station side is configured for: increasing, according to a maximum radius of LTE ultra-long-range communication coverage, an uplink feedback sub-frame interval of the base station side, transmitting the uplink scheduling information, receiving the data transmitted by the terminal side at a sub-frame with the increased uplink feedback sub-frame interval of the terminal side, and transmitting data check information at a sub-frame with the increased uplink feedback sub-frame interval of the base station side, wherein the terminal side is further configured for: receiving the data check information transmitted by the base station side at the sub-frame with the increased uplink feedback sub-frame interval of the base station side.

12. The system according to claim 11, wherein the terminal side comprises a first uplink receiving module and a first uplink transmitting module, wherein the first uplink receiving module is configured for receiving the uplink scheduling information transmitted by the base station side and the data check information transmitted by the base station side at the sub-frame with the increased uplink feedback sub-frame interval of the base station side; and the first uplink transmitting module is configured for: after the first uplink receiving module receives the uplink scheduling information transmitted by the base station side, transmitting the data at the sub-frame with the increased uplink feedback sub-frame interval of the terminal side; and the base station side comprises a second uplink receiving module and a second uplink transmitting module, wherein the second uplink receiving module is configured for receiving the data transmitted by the terminal side at the sub-frame with the increased uplink feedback sub-frame interval of the terminal side; and the second uplink transmitting module is configured for transmitting the uplink scheduling information and transmitting the data check information at the sub-frame with the increased uplink feedback sub-frame interval of the base station side.

13. The system according to claim 12, wherein an increased downlink feedback sub-frame interval and an increased downlink feedback sub-frame interval of the base station side are respectively greater than a downlink feedback sub-frame interval of the terminal side and a downlink feedback sub-frame interval of the base station side in case that a maximum radius of LTE communication coverage is less than or equal to 100 km;

the terminal side further comprises a first downlink receiving module and a first downlink transmitting module, wherein the first downlink receiving module is configured for receiving downlink scheduling information transmitted by the base station side and receiving repeated data or new data transmitted by the base station side at a sub-frame with the increased downlink feedback sub-frame interval of the base station side; and the first downlink transmitting module is configured for: after the first downlink receiving module receives the downlink scheduling information transmitted by the base station side, feeding back check information at a sub-frame with the increased downlink feedback sub-frame interval of the terminal side; and the base station side further comprises a second downlink receiving module and a second downlink transmitting module, wherein the second downlink receiving module is configured for receiving the check information fed back by the terminal side at the sub-frame with the increased downlink feedback sub-frame interval of the terminal side; and the second downlink transmitting module is configured for transmitting the downlink scheduling information and transmitting the repeated data or the new data at the sub-frame with the increased downlink feedback sub-frame interval of the base station side.

14. A terminal side equipment, comprising a first uplink receiving module and a first uplink transmitting module, wherein the first uplink receiving module is configured for receiving uplink scheduling information transmitted by a base station side equipment and data check information transmitted by the base station side equipment at a sub-frame with an increased uplink feedback sub-frame interval of the base station side equipment, wherein the increased uplink feedback sub-frame interval of the base station side equipment is increased according to a maximum radius of LTE ultra-long-range communication coverage; and the first uplink transmitting module is configured for: after the first uplink receiving module receives the uplink scheduling information transmitted by the base station side equipment, transmitting data at a sub-frame with an increased uplink feedback sub-frame interval of the terminal side equipment, wherein the increased uplink feedback sub-frame interval of the terminal side equipment is increased according to a maximum radius of LTE ultra-long-range communication coverage.

15. The terminal side equipment according to claim 14, further comprising a first downlink receiving module and a first downlink transmitting module, wherein the first downlink receiving module is configured for receiving downlink scheduling information transmitted by the base station side equipment and receiving repeated data or new data transmitted by the base station side equipment at a sub-frame with an increased downlink feedback sub-frame interval of the base station side equipment; and the first downlink transmitting module is configured for: after the first downlink receiving module receives the downlink scheduling information transmitted by the base station side equipment, feeding back check information at a sub-frame with an increased downlink feedback sub-frame interval of the terminal side equipment.

16. A base station side equipment, comprising a second uplink receiving module and a second uplink transmitting module, wherein the second uplink receiving module is configured for receiving data transmitted by a terminal side equipment at a sub-frame with an increased uplink feedback sub-frame interval of the terminal side equipment, wherein the increased uplink feedback sub-frame interval of the terminal side equipment is increased according to a maximum radius of LTE ultra-long-range communication coverage; and the second uplink transmitting module is configured for transmitting uplink scheduling information and transmitting data check information at a sub-frame with an increased uplink feedback sub-frame interval of the base station side equipment, wherein the increased uplink feedback sub-frame interval of the base station side equipment is increased according to a maximum radius of LTE ultra-long-range communication coverage.

17. The base station side equipment according to claim 16, further comprising a second downlink receiving module and a second downlink transmitting module, wherein the second downlink receiving module is configured for receiving check information fed back by the terminal side equipment at a sub-frame with an increased downlink feedback sub-frame interval of the terminal side equipment; and the second downlink transmitting module is configured for transmitting downlink scheduling information and transmitting repeated data or new data at a sub-frame with an increased downlink feedback sub-frame interval of the base station side equipment.

* * * * *